No. 648,852. Patented May 1, 1900.
R. J. COUSINS, J. W. FLOWER & A. P. PROUT.
BOTTLE FILLING MACHINE.
(Application filed Dec. 30, 1897. Renewed Mar. 24, 1900.)
(No Model.)
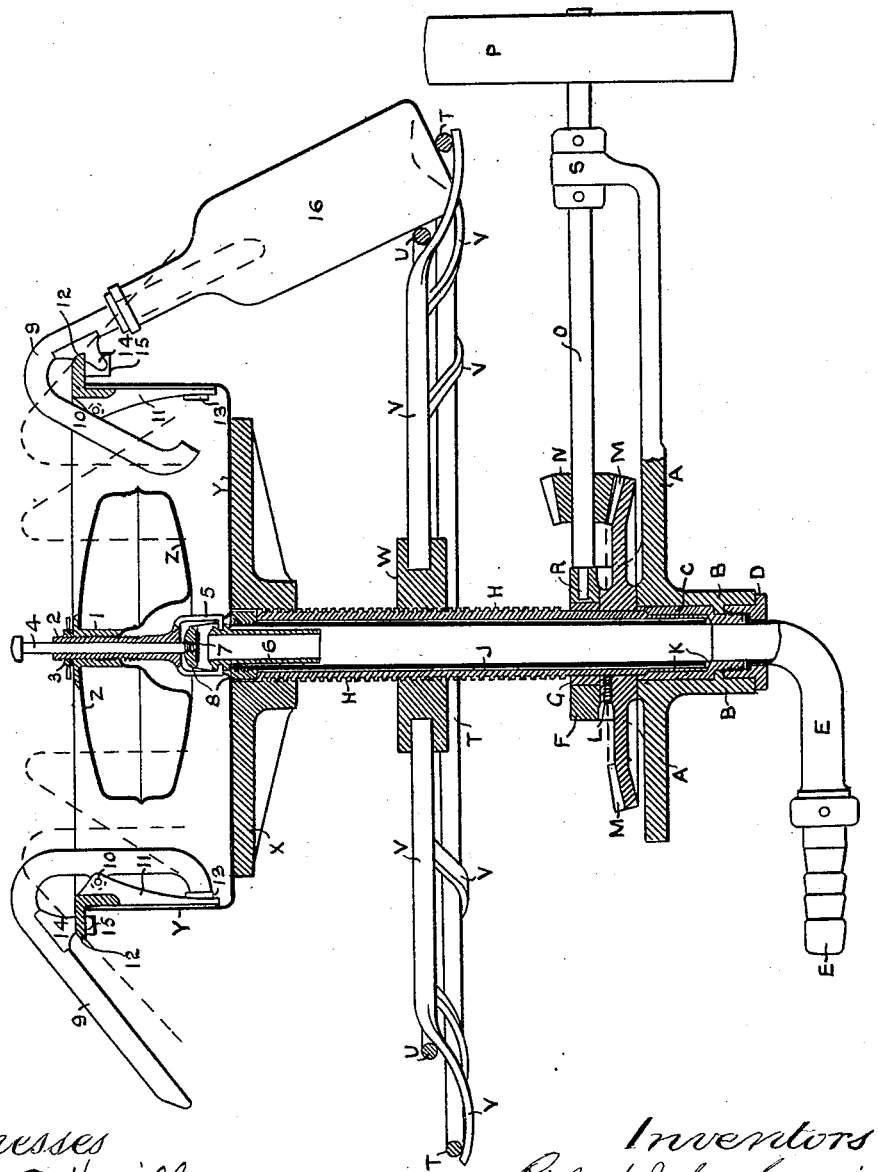

UNITED STATES PATENT OFFICE.

ROBERT JOHN COUSINS, JOHN WALTER FLOWER, AND ALGERNON P. PROUT, OF FONTMELL MAGNA, ENGLAND.

BOTTLE-FILLING MACHINE.

SPECIFICATION forming part of Letters Patent No. 648,852, dated May 1, 1900.

Application filed December 30, 1897. Renewed March 24, 1900. Serial No. 10,092. (No model.)

*To all whom it may concern:*

Be it known that we, ROBERT JOHN COUSINS, JOHN WALTER FLOWER, and ALGERNON PETER PROUT, subjects of the Queen of Great Britain, residing at Fontmell Magna, in the county of Dorset, England, have invented certain new and useful Improvements in Bottle-Filling Machines; and we do hereby declare the following to be a full, clear, and exact description of the invention, such as will enable others skilled in the art to which it appertains to make and use the same.

This invention relates to improvements in bottle-filling machines of the kind wherein a rotatable reservoir having filling-tubes is employed.

According to our invention we provide means whereby the valve regulating the flow of the liquid with which the bottles are filled into the reservoir can be adjusted so as to vary the height to which the said liquid is allowed to flow into the reservoir, in order to adapt the apparatus for filling bottles of different capacities. We also provide means whereby the filling-tubes are normally closed and are opened when the bottles to be filled are placed in position on an adjustable support or stand.

In order that our invention may be more readily understood, we have caused to be attached hereto one sheet of drawings, in which similar letters and numerals refer to similar parts.

The drawings represent a sectional elevation of the apparatus.

Our apparatus consists of a base-plate A, having on its lower side a boss B, with bush C of suitable material. The lower end of said bush is screwed for the nut D, forming a union for the inlet-pipe E. On the upper side of said base-plate A is a boss F, connected to the base-plate by means of two webs. The boss F has a bush G of suitable material. The bushed bosses B and F form bearings for the revolving tube H, which has a thread cut on it outside and a brass lining J inside. The end of the tube H is formed with a sleeve K, preferably of phosphor-bronze. The tube H has also attached to it, by means of a screw L or other suitable means, a bevel-wheel M, driven by bevel-pinion N on spindle O, to which is keyed the driving-pulley P. If desired, fast and loose pulleys may be used. The said spindle O runs in suitable bearings, as shown at R and S. The bottle-stand consists of two rings T and U, supported by the arms V, preferably cast in the nut W, which can be screwed up and down the tube H to suit the different lengths of bottle. The nut W is provided with any well-known means of locking in any position on the said tube. To the top of the tube H is fixed the bossed plate X, which has riveted to it the reservoir Y, preferably formed of tinned copper. The flow of liquid to the reservoir is regulated as follows: A float Z is formed at its center into a nut 1, working on the screwed sleeve 2, with lock-nut 3. The sleeve 2, sliding on the guide 4, is formed at its lower end into a fork 5, engaging with the tubular sliding valve 6, working against an india-rubber or other suitable seat 7, fixed to the shackle-piece 8, which is screwed to the top of the tube H. It will be readily understood that any liquid under pressure admitted to the inlet-pipe E will rise through the tube H and valve 6 into the reservoir until the float is raised sufficiently to close the valve. Should any liquid be drawn off from the reservoir, the float will fall, opening the valve and admitting a further supply. By means of the screw 2 and lock-nut 3 the float may be adjusted to maintain any desired depth of liquid. The filling-tubes consist of a suitable number of tubes 9, preferably about twelve, in the form of siphons, hinged at 10 to the projections 11, formed on a removable angle-ring 12. The projections 11 are also provided with suitable disks 13, preferably of india-rubber, forming, with the ends of the filling-tubes, valves regulating the flow of liquid through the siphons or tubes 9. The said tubes are provided with projections 14, working against flat springs 15, the tendency of which is to keep the ends of the tubes against the disks. The dotted lines represent the center lines of other tubes. A bottle 16 is shown on the machine in position for filling. It will be readily understood that the act of putting the bottle over the tube causes the end of said tube to move away from the india-rubber disks and so allows the liquid in the reservoir to pass into the bottle. As the reservoir and bottle-stand are caused to rotate at a suitable speed the attendant has simply to put on the empty bottles and remove the full ones.

Our bottle-filling machines can be employed alone or in conjunction with a suitable corking-machine, in which latter case suitable mechanism is provided for enabling the reservoir to be rotated at the same speed as the bottle-stand or support of the corking-machine.

Having now particularly described and ascertained the nature of our said invention and in what manner the same is to be performed, we declare that what we claim is—

1. In a bottle-filling machine, the combination with the externally-threaded tube H, surmounted by a reservoir Y of the adjustable bottle-stand, comprising the nut, W, arms V, and rings T, U, the rings being so arranged as to hold the bottles at an angle or inclination, substantially as described.

2. In a bottle-filling machine the combination with the reservoir V and siphon 9 of the movable ring 12 supported on the edge of the reservoir, substantially as described.

3. In a bottle-filling machine, the combination with a central filling-tube, and a reservoir mounted thereon, of the adjustable float Z, having central nut, 1, screw-threaded sleeve-guide 4, having at its lower end the fork, 5, sliding valve 6, shackle-piece 8, and seat 7, substantially as described.

In testimony whereof we affix our signatures in presence of two witnesses.

ROBERT JOHN COUSINS.
JOHN WALTER FLOWER.
ALGERNON P. PROUT.

Witnesses:
G. F. WARREN,
THOS. C. HOMILLER.